US008023922B2

(12) United States Patent
Van Zeijl et al.

(10) Patent No.: US 8,023,922 B2
(45) Date of Patent: Sep. 20, 2011

(54) RECEIVER FOR SIMULTANEOUSLY RECEIVING DIFFERENT STANDARDS

(75) Inventors: Paul Van Zeijl, Eindhoven (NL); Neil Bird, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 906 days.

(21) Appl. No.: 11/815,881

(22) PCT Filed: Feb. 6, 2006

(86) PCT No.: PCT/IB2006/050376

§ 371 (c)(1),
(2), (4) Date: Aug. 9, 2007

(87) PCT Pub. No.: WO2006/085255

PCT Pub. Date: Aug. 17, 2006

(65) Prior Publication Data

US 2008/0146185 A1 Jun. 19, 2008

(30) Foreign Application Priority Data

Feb. 14, 2005 (EP) .................................... 05101070

(51) Int. Cl.
*H04B 1/26* (2006.01)

(52) U.S. Cl. ........................................ 455/314; 455/317

(58) Field of Classification Search .................... 455/84, 455/86, 550.1, 552.1, 553.1, 575.1, 313, 455/314, 315, 317, 323
See application file for complete search history.

(56) References Cited

U.S. PATENT DOCUMENTS 6,195,563 B1 * 2/2001 Samuels ........................ 455/84
6,236,847 B1 5/2001 Stikvoort
6,675,024 B1 * 1/2004 Loke et al. ................. 455/553.1
2002/0173337 A1 11/2002 Hajimiri et al.

(Continued)

FOREIGN PATENT DOCUMENTS

EP 1119137 A1 7/2001
EP 1473844 A1 11/2004
WO WO0135578 A1 5/2001
WO WO2005107059 A1 11/2005

OTHER PUBLICATIONS

Cho et al: A 2.4GHz Dual-Mode 0.18 um CMOS Transceiver for Bluetooth and 802.11b; 2003 IEEE International Solid-State Circuits Conference, ISSCC 2003, Session 5, Wireless-Pan Transceivers, Paper 5.2.

(Continued)

*Primary Examiner* — Thanh Le
(74) *Attorney, Agent, or Firm* — Larry Liberchuk

(57) ABSTRACT

Receivers (5) for simultaneously receiving different radio frequency signals according to different standards are provided with first frequency translating stages (1) for converting the radio frequency signals into first intermediate frequency signals and second frequency translating stages (2) for converting the first intermediate frequency signals into second intermediate frequency signals and processing stages (3) for retrieving first information from the first intermediate frequency signals and second information from the second intermediate signals. As a result, such receivers (5) have relatively low power consumption. The first frequency translating stages (1) comprise first oscillators (19) and first mixers (11) and further first mixers (12). The second frequency translating stages (2) comprise second oscillators (29) and second mixers (21) and further second mixers (22) and third mixers (23) and further third mixers (24). The processing stages (3) comprise filters (31) for filtering the first intermediate frequency signals for removing the second information and further filters (32) for filtering the second intermediate frequency signals for removing the first information.

13 Claims, 3 Drawing Sheets

4
41
42
1
11
12
19
2
22
21
24
23
25
26
29
3
36
32
31
33
34
35
5

U.S. PATENT DOCUMENTS

2004/0142723 A1 7/2004 Shippee

OTHER PUBLICATIONS

Darabi et al: "A Dual Mode 802.11b/Bluetooth Radio in 0.35um CMOS": 2003 IEEE International Solid-State Circuits Conference, ISSCC 2003, Session 5, Wireless-Pan Transceivers, Paper 5.1.

Emira et al: "A Dual-Mode 802.11b/Bluetooth Receiver in 0.25um BiCMOS"; 2004 IEEE International Solid-State Circuits Conference; ISSCC 2004, Session 15, Wireless Consumer ICS, Paper 15.2.

Jung et al: "A Dual-Mode Direct-Conversion CMOS Transceiver for Bluetooth and 802.11b"; 29th European Solid-State Sircuits Conference (ESSCIRC 2003), pp. 225-228, Sep. 2003.

* cited by examiner

RECEIVER FOR SIMULTANEOUSLY RECEIVING DIFFERENT STANDARDS

The invention relates to a receiver for simultaneously receiving first radio frequency signals according to a first standard and second radio frequency signals according to a second standard different from the first standard, and also relates to a frequency translating circuit, to a method and to a processor program product.

Examples of such a receiver are wireless receivers, wireless transceivers and wireless interfaces.

WO 01/035578 A1 discloses a transceiver comprising a first up/down conversion pair and a second up/down conversion pair. In this transceiver, down converting parts of both up/down conversion pairs form a receiver, and up converting parts of both up/down conversion pairs form a transmitter. These up/down conversion pairs are parallel pairs for receiving signals in accordance with different protocols at the same time.

The known receiver is disadvantageous, inter alia, owing to the fact that its power consumption is relatively high.

It is an object of the invention, inter alia, to provide a receiver as defined above having a relatively low power consumption.

Further objects of the invention are, inter alia, to provide a frequency translating circuit, a method and a processor program product for use in (combination with) the receiver having a relatively low power consumption.

The receiver according to the invention for simultaneously receiving first radio frequency signals according to a first standard and second radio frequency signals according to a second standard different from the first standard, which first frequency signals comprise first information and which second radio frequency signals comprise second information, comprises:

a first frequency translating stage for converting the first and second radio frequency signals into first intermediate frequency signals;

a second frequency translating stage for converting the first intermediate frequency signals into second intermediate frequency signals; and a processing stage for retrieving the first information from the first intermediate frequency signals and the second information from the second intermediate signals.

The first frequency translating stage converts both kinds of radio frequency signals into first intermediate frequency signals, from which first intermediate frequency signals the first information is to be retrieved. The second frequency translating stage converts the first intermediate frequency signals into second intermediate frequency signals, from which second intermediate frequency signals the second information is to be retrieved. So, the first frequency translating stage is used for simultaneously frequency translating both kinds of radio frequency signals, such that the first information can be retrieved from these first intermediate frequency signals. The second frequency translating stage is used for frequency translating the first intermediate frequency signals, such that the second information can be retrieved from the second intermediate frequency signals.

The prior art receiver splits the radio frequency signals and down converts the split radio frequency signals via two separate high-frequency units. The receiver according to the invention frequency translates both kinds of radio frequency signals together via one high-frequency unit (the first frequency translating stage) and then frequency translates the first intermediate frequency signals via one intermediate-frequency unit (the second frequency translating stage).

Owing to the fact that power consumption is proportional with frequency, the two separate high-frequency units according to the prior art will consume more power than the one high-frequency unit according to the invention. As a result, the receiver according to the invention has a relatively low power consumption and is relatively low cost.

An embodiment of the device according to the invention is defined by the first frequency translating stage comprising a first oscillator and a first mixer coupled to the first oscillator. Such a first oscillator for example comprises a first phase locked loop.

An embodiment of the device according to the invention is defined by the first frequency translating stage further comprising a further first mixer coupled to the first oscillator. The first mixer for example generates a so-called inphase first intermediate frequency signal and the further first mixer for example generates a so-called quadrature first intermediate frequency signal.

An embodiment of the device according to the invention is defined by the second frequency translating stage comprising a second oscillator and a second mixer coupled to the second oscillator. Such a second oscillator for example comprises a second phase locked loop. To save costs, the first and second phase locked loop may use the same crystal.

An embodiment of the device according to the invention is defined by the second frequency translating stage further comprising a further second mixer coupled to the second oscillator. The second mixer for example generates a so-called inphase second intermediate frequency signal and the further second mixer for example generates a so-called quadrature second intermediate frequency signal.

An embodiment of the device according to the invention is defined by the second frequency translating stage further comprising a third mixer and a further third mixer coupled to the second oscillator and further comprising a first adder and a second adder, inputs of the first adder being coupled to outputs of the second and third mixers and inputs of the second adder being coupled to outputs of the further second and further third mixer. The third and further third mixers are used for canceling images resulting from frequency translations of the first intermediate frequency signals as performed by the second and further second mixers.

An embodiment of the device according to the invention is defined by the processing stage comprising a filter for filtering the first intermediate frequency signals for removing the second information. The filter may further have for example an automatic gain control function and a limiting function.

An embodiment of the device according to the invention is defined by the processing stage further comprising a further filter for filtering the second intermediate frequency signals for removing the first information. The further filter may further have for example an automatic gain control function and a limiting function.

An embodiment of the device according to the invention is defined by the processing stage further comprising a third adder and a fourth adder, inputs of the third adder being coupled to outputs of the filter and the further filter and inputs of the fourth adder being coupled to further outputs of the filter and the further filter, and outputs of the third adder and the fourth adder being coupled to inputs of an analog-to-digital converter. The further filter and the third and fourth adders allow one analog-to-digital converter to be used for digitizing the filtered first and second intermediate signals. A processor can then retrieve the first and second information substantially simultaneously from the digitized filtered first and second intermediate frequency signals. Alternatively, the further filter as well as the third and fourth adders can be avoided by introducing a further analog-to-digital converter for digitizing the second intermediate frequency signals.

An embodiment of the device according to the invention is defined by the first standard being a Wireless Local Area Network standard and the second standard being a Bluetooth standard. Both standards or protocols for example operate in the 2.4-2.5 GHz band, other standards or protocols for example operating in substantially the same band are not to be excluded.

Embodiments of the frequency translating circuit according to the invention and of the method according to the invention and of the processor program product according to the invention correspond with the embodiments of the receiver according to the invention.

The invention is based upon an insight, inter alia, that power consumption is proportional with frequency and that two separate high-frequency units will consume more power than one high-frequency unit, and is based upon a basic idea, inter alia, that a first frequency translating stage should convert both the first and second radio frequency signals into first intermediate frequency signals for retrieving first information and a second frequency translating stage should convert the first intermediate frequency signals into second intermediate frequency signals for retrieving second information.

The invention solves the problem, inter alia, to provide a receiver for simultaneously receiving first radio frequency signals according to a first standard and second radio frequency signals according to a second standard different from the first standard and having a relatively low power consumption, and is further advantageous, inter alia, in that the receiver is relatively low cost.

These and other aspects of the invention will be apparent from and elucidated with reference to the embodiments(s) described hereinafter.

Figure 1:
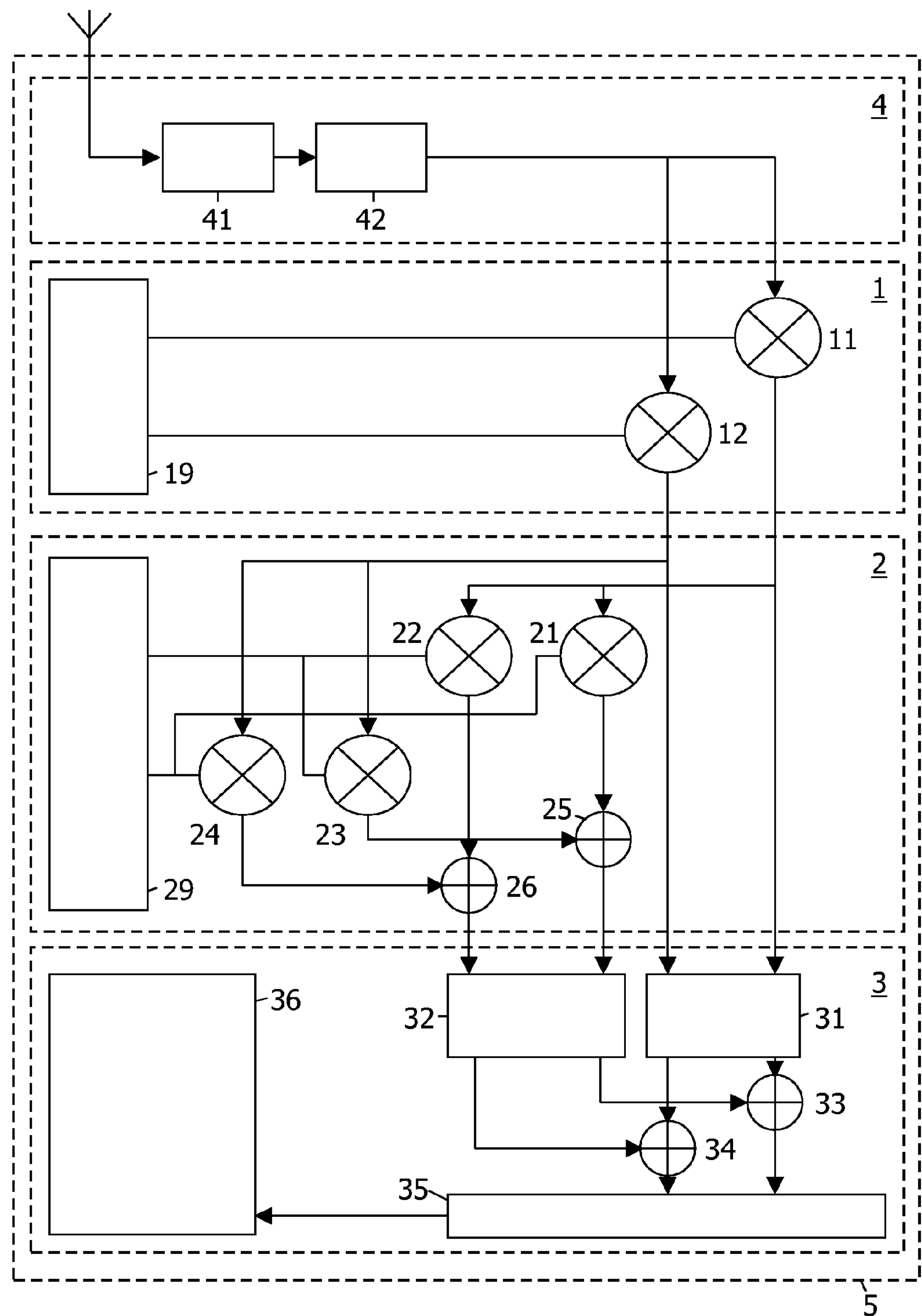
FIG. 1 shows diagrammatically a receiver according to the invention comprising a frequency translating circuit according to the invention including a first frequency translating stage and a second frequency translating stage.

The receiver 5 according to the invention shown in FIG. 1 comprises an antenna stage 4, a first frequency translating stage 1, a second frequency translating stage 2 and a processing stage 3. The antenna stage 4 comprises an antenna coupled via an antenna filter 41 to a low noise amplifier 42. The first frequency translating stage 1 comprises a first mixer 11 and a further first mixer 12 comprising first inputs coupled to an output of the low noise amplifier 42. Second inputs of the first and further first mixers 11 and 12 are coupled to outputs of a first oscillator 19. An inphase first oscillation signal is supplied from the first oscillator 19 to the first mixer 11 and a quadrature first oscillation signal is supplied from the first oscillator 19 to the further first mixer 12. As a result, the first mixer 11 generates an inphase first intermediate signal and the further first mixer 12 generates a quadrature first intermediate signal.

The second frequency translating stage 2 comprises a second mixer 21 and a further second mixer 22 comprising first inputs coupled to an output of the first mixer 11 and comprises a third mixer 23 and a further third mixer 24 comprising first inputs coupled to an output of the further first mixer 12.

Second inputs of the second and further third mixers 21 and 24 are coupled to a first output of a second oscillator 29. Second inputs of the further second and third mixers 22 and 23 are coupled to a second output of the second oscillator 29. An inphase second oscillation signal is supplied from the second oscillator 29 to the further second and third mixers 22 and 23 and a quadrature second oscillation signal is supplied from the second oscillator 29 to the second and further third mixers 21 and 24. As a result, the second and third mixers 21 and 23 generate inphase second intermediate signals and the further second and further third mixers 22 and 24 generate quadrature second intermediate signals.

A first adder 25 is coupled to outputs of the second and third mixers 21 and 23 and generates an inphase second intermediate signal from which images have been cancelled. A second adder 26 is coupled to outputs of the further second and further third mixers 22 and 24 and generates a quadrature second intermediate signal from which images have been cancelled. These images are present in the second intermediate frequency signals at the outputs of the mixers 21-24 and are the result of the second intermediate frequency signals having been frequency translated twice.

The processing stage 3 comprises a filter 31 coupled to the outputs of the first and further first mixers 11 and 12 for filtering the inphase and quadrature first intermediate signals and comprises a further filter 32 coupled to outputs of the first and second adders 25 and 26 for filtering the inphase and quadrature second intermediate signals from which the images have been cancelled. A third adder 33 comprises two inputs coupled to first outputs of the filter 31 and the further filter 32, and a fourth adder 34 comprises two inputs coupled to second outputs of the filter 31 and the further filter 32. Outputs of the adders 33 and 34 are coupled to inputs of an analog-to-digital converter 35, which is further coupled to a processor 36 for digital signal processing.

As a result, the receiver 5 can simultaneously receive first radio frequency signals according to a first standard or a first protocol such as for example a Wireless Local Area Network standard and second radio frequency signals according to a second standard or second protocol such as for example a Bluetooth standard and different from the first standard or the first protocol. The first frequency signals comprise first information and the second radio frequency signals comprise second information. The first frequency translating stage 1 converts the first and second radio frequency signals into first intermediate frequency signals such as for example (almost) zero Intermediate Frequency signals or (almost) 0-IF signals, and the second frequency translating stage 2 converts the first intermediate frequency signals into second intermediate frequency signals. The processing stage 3 retrieves the first information from the first intermediate frequency signals and the second information from the second intermediate signals.

The filter 31 filters the first intermediate frequency signals for (substantially) removing the second information and the further filter 32 filters the second intermediate frequency signals for (substantially) removing the first information. The filter 31 and the further filter 32 may further have for example an automatic gain control function and a limiting function. The further filter 32 and the third and fourth adders 33 and 34 allow one analog-to-digital converter 35 to be used for digitizing the filtered first and second intermediate signals. Of course, for digitizing inphase and quadrature signals, for example two (real) analog-to-digital converters or one complex analog-to-digital converter will need to be used. The processor 36 can then retrieve the first and second information substantially simultaneously from the digitized filtered first and second intermediate frequency signals. Alternatively, the further filter 32 as well as the third and fourth adders 33 and 34 can be avoided by introducing a further analog-to-digital converter not shown (and also comprising for example two (real) analog-to-digital converters or one complex analog-to-digital converter) for digitizing the second intermediate frequency signals.

In case of the first radio frequency signals being in accordance with a Wireless Local Area Network (WLAN) standard and the second radio frequency signals being in accordance with a Bluetooth (BT) standard, the first frequency signals comprise first information or WLAN information and the second radio frequency signals comprise second information or BT information. Then, the following table shows some examples of frequencies, whereby the first oscillation signal is defined by LO1, the second oscillation signal is defined by LO2, the first intermediate frequency signals are defined by IF1 and the second intermediate frequency signals are defined by IF2.

| Antenna signal | | | IF1 | | | |
|---|---|---|---|---|---|---|
| WLAN (MHz) | Bluetooth (MHz) | LO1 (MHz) | WLAN (MHz) | Bluetooth (MHz) | LO2 (MHz) | IF2 |
| 2402-2422 | 2450 | 2412 | 0-10 | 38 | 27/49 | 11/−11 |
| | 2480 | | 0-10 | 68 | 57/79 | 11/−11 |
| 2432-2452 | 2402 | 2442 | 0-10 | −40 | −51/−29 | 11/−11 |
| | 2455 | | 0-10 | 13 | 2/24 | 11/−11 |
| | 2480 | | 0-10 | 38 | 27/49 | 11/−11 |
| 2462-2482 | 2402 | 2472 | 0-10 | −70 | −81/−59 | 11/−11 |
| | 2450 | | 0-10 | −22 | −33/−11 | 11/−11 |
| | 2461 | | 0-10 | −11 | −22/0 | 11/−11 |

According to these examples, the filter 31 will be a low pass filter for filtering frequencies above 10 MHz and for removing the BT information. The further filter 32 will be a band pass filter for filtering frequencies below 10.5 MHz and above 11.5 MHz and for removing the WLAN information. Owing to the fact that, in the first intermediate frequency signals IF1, the BT information may be anywhere between minus 70 MHz and plus 70 MHz, without the second and further second mixers 21 and 22, the further filter 32 would become relatively complex and expensive. Owing to the fact that these second and further second mixers 21 and 22 introduce so-called images, the third and further third mixers 23 and 24 have been introduced to further reduce the complexity and the costs of the further filter 32.

In a minimum situation, the first frequency translating stage 1 comprises one mixer and the second frequency translating stage 2 comprises one mixer. In a more advanced situation such as an inphase and quadrature situation, both frequency translating stages 1 and 2 will each comprise two mixers. In a yet more advanced situation, the second frequency translating stage 2 will comprise four mixers for canceling the images.

Figure 2:
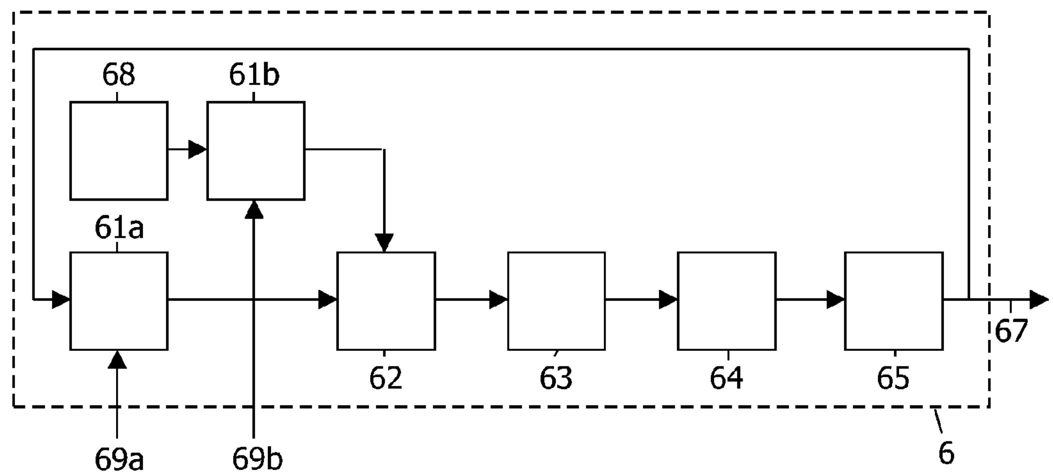
FIG. 2 shows diagrammatically an oscillator comprising a voltage controlled oscillator for use in a frequency translating stage.

The oscillator 6 in the form of a phase locked loop shown diagrammatically in FIG. 2 for use in a frequency translating stage such as the second frequency translating stage 2 comprises a voltage controlled oscillator 65 comprising an input coupled to an output of a low pass filter 64. An input of the low pass filter 64 is coupled to an output of a charge pump 63. An input of the charge pump 63 is coupled to an output of a phase-frequency detector 62, of which a control input is coupled to a crystal 68 via a divider 61*b* and of which an input is coupled to an output of a divider 61*a*. An input of the divider 61*a* is coupled to an output 67 of the voltage controlled oscillator 65, and a control input 69*a* of the divider 61*a* can be used for adjusting a division of the divider 61*a*, and a control input 69*b* of the divider 61*b* can be used for adjusting a division of the divider 61*b*. This might be necessary for giving the second oscillation signal several different values, as required by the examples shown in the table (for LO2).

The output 67 of the voltage controlled oscillator 65 forms the output of the oscillator 6. This oscillator 6 for example forms an embodiment of the second oscillator 29, a similar embodiment can however be used for the first oscillator 19, whereby the relatively expensive crystal 68 is to be used for both embodiments, to save costs. Inphase and quadrature oscillation signals at the output 67 of the voltage controlled oscillator 65 can be derived common in the art. One of the possibilities for generating an inphase and quadrature signal is by using a divide-by-two circuit.

Figure 3:
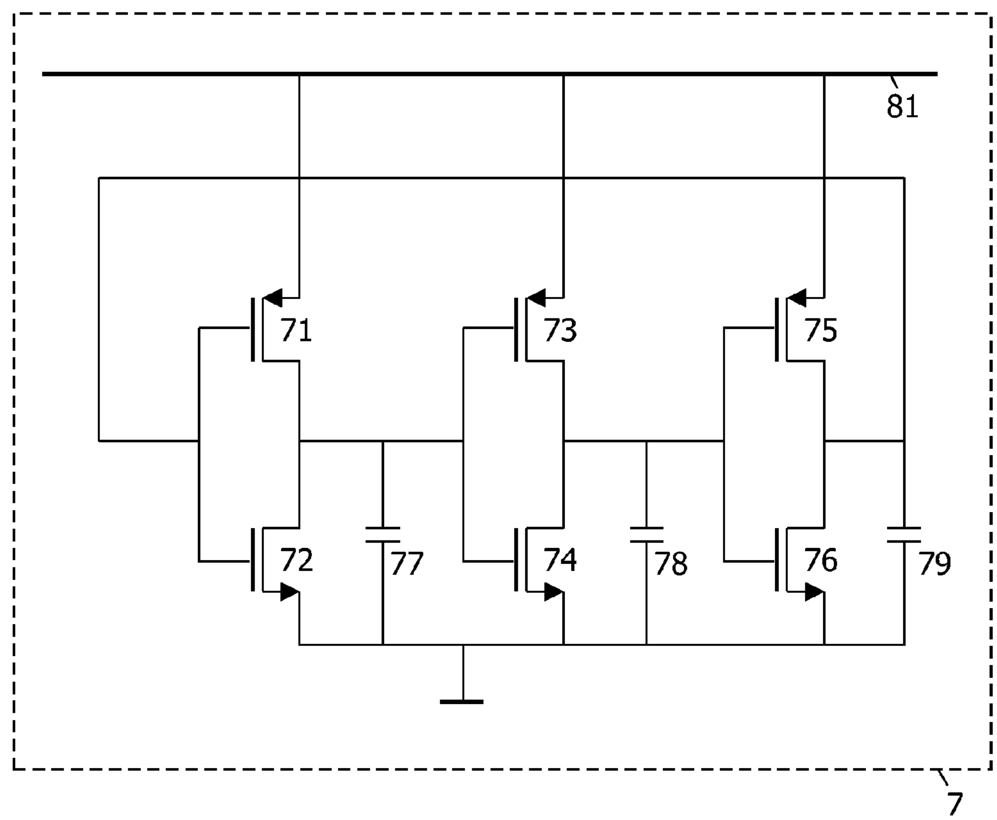
FIG. 3 shows diagrammatically a voltage controlled oscillator for use in an oscillator.

The voltage controlled oscillator 7 shown diagrammatically in FIG. 3 for use in an oscillator such as the oscillator 6 comprises transistors 71 and 72 of which the control electrodes (gates) are coupled to each other. A first main electrode (source) of the transistor 71 (PMOS) is coupled to a supply 81 and a first main electrode (source) of the transistor 72 (NMOS) is coupled to ground. Second main electrodes (drains) of the transistors 71 and 72 are coupled to each other and to a capacitor 77 further coupled to ground.

The voltage controlled oscillator 7 further comprises transistors 73 and 74 of which the control electrodes (gates) are coupled to each other and to the capacitor 77. A first main electrode (source) of the transistor 73 (PMOS) is coupled to the supply 81 and a first main electrode (source) of the transistor 74 (NMOS) is coupled to ground. Second main electrodes (drains) of the transistors 73 and 74 are coupled to each other and to a capacitor 78 further coupled to ground.

The voltage controlled oscillator 7 further comprises transistors 75 and 76 of which the control electrodes (gates) are coupled to each other and to the capacitor 78. A first main electrode (source) of the transistor 75 (PMOS) is coupled to the supply 81 and a first main electrode (source) of the transistor 76 (NMOS) is coupled to ground. Second main electrodes (drains) of the transistors 75 and 76 are coupled to each other and to a capacitor 79 further coupled to ground. This capacitor 79 is further coupled to the control electrodes (gates) of the transistors 71 and 72. The voltage controlled oscillator 7 for example forms an embodiment of the voltage controlled oscillator 65 shown in FIG. 2. Each pair of coupled second main electrodes can be used as an output. By adjusting the supply 81 and/or by using voltage-dependent capacitors 77-79 and adjusting the voltage on such capacitors, the oscillating frequency of the voltage controlled oscillator 7 can be adjusted.

Figure 4:
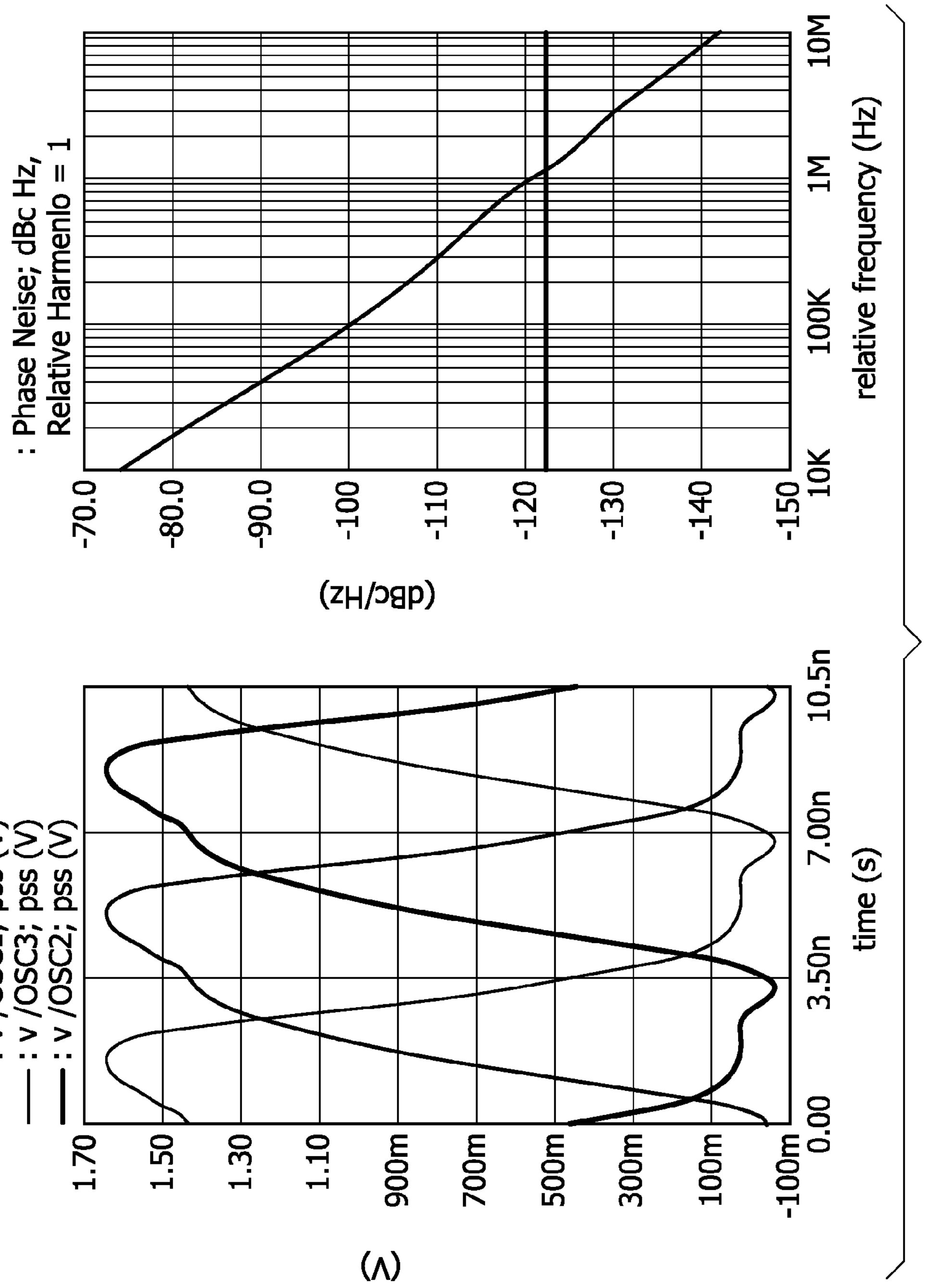
FIG. 4 shows simulation results of the voltage controlled oscillator shown in FIG. 3.

FIG. 4 shows simulation results of the voltage controlled oscillator 7 shown in FIG. 3. At a very low power consumption, phase-noise requirements for Bluetooth can be reached. As a result, the power consumption of the second frequency translating stage can be ignored compared to the power consumption of the first frequency translating stage.

In most cases the WLAN signal does not change frequency, and the first oscillation signal LO1 can be a fixed frequency. As the Bluetooth signal hops through for example the so-called ISM band at a rate of for example 1600 hops/s, the second oscillation signal LO2 will have to follow that same hopping sequence. Usual Bluetooth receivers have a 2.5 GHz Phase Locked Loop to generate this hopping sequence. Generating the hopping sequence in a 100 MHz Phase Locked Loop for this application is no problem.

The principle described above can of course also be used for another combination of standards and protocols. Instead of using 11 MHz as a centre frequency for the Bluetooth signal as has been done for the examples in the table, other centre frequencies may be chosen such as for example 15 or 20 MHz.

In the case the WLAN signal is not fixed in frequency (there is an optional "channel agility" defined in 802.11b), then the first oscillation signal LO1 should follow the WLAN hopping and the second oscillation signal LO2 should follow the Bluetooth hopping (and include of course the hopping as defined by the first oscillation signal LO1). Thereto, both oscillators 19 and 29 might for example comprise adjustable dividers as the dividers 61*a* and 61*b* shown in FIG. 2 and controlled by for example the processor 36. To minimize the loss of packets, the WLAN and the Bluetooth hopping sequences are to be synchronized.

In practice, an inphase and/or a quadrature might not be perfect, and therefore an inphase signal might comprise a substantially inphase signal and a quadrature signal might comprise a substantially quadrature signal.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Receiver for simultaneously receiving first radio frequency signals according to a first standard and second radio frequency signals according to a second standard different from the first standard, the first frequency signals including first information and the second radio frequency signals including second information, the receiver comprising:

a first frequency translating stage for converting the first and second radio frequency signals into first intermediate frequency signals;

a second frequency translating stage for converting the first intermediate frequency signals into second intermediate frequency signals; and a processing stage for retrieving the first information from the first intermediate frequency signals and the second information from the second intermediate frequency signals.

2. Receiver according to claim 1, the first frequency translating stage comprising a first oscillator and a first mixer coupled to the first oscillator.

3. Receiver according to claim 2, the first frequency translating stage further comprising a further first mixer coupled to the first oscillator.

4. Receiver according to claim 1, the second frequency translating stage comprising a second oscillator and a second mixer coupled to the second oscillator.

5. Receiver according to claim 4, the second frequency translating stage further comprising a further second mixer coupled to the second oscillator.

6. Receiver according to claim 5, the second frequency translating stage further comprising a third mixer and a further third mixer coupled to the second oscillator and further comprising a first adder and a second adder, inputs of the first adder being coupled to outputs of the second and third mixers and inputs of the second adder being coupled to outputs of the further second and further third mixer.

7. Receiver according to claim 1, the processing stage comprising a filter for filtering the first intermediate frequency signals for removing the second information.

8. Receiver according to claim 7, the processing stage further comprising a further filter for filtering the second intermediate frequency signals for removing the first information.

9. Receiver according to claim 8, the processing stage further comprising a third adder and a fourth adder, inputs of the third adder being coupled to outputs of the filter and the further filter and inputs of the fourth adder being coupled to further outputs of the filter and the further filter, and outputs of the third adder and the fourth adder being coupled to inputs of an analog-to-digital converter.

10. Receiver according to claim 1, the first standard being a Wireless Local Area Network standard and the second standard being a Bluetooth standard.

11. Frequency translating circuit for use in a receiver as defined in claim 1, the frequency translating circuit comprising:

the first frequency translating stage for converting the first and second radio frequency signals into the first intermediate frequency signals; and the second frequency translating stage for converting the first intermediate frequency signals into the second intermediate frequency signals.

12. Method for simultaneously receiving first radio frequency signals according to a first standard and second radio frequency signals according to a second standard different from the first standard, the first frequency signals including first information and the second radio frequency signals including second information, the method comprising:

converting the first and second radio frequency signals into first intermediate frequency signals;

converting the first intermediate frequency signals into second intermediate frequency signals; and retrieving the first information from the first intermediate frequency signals and the second information from the second intermediate signals.

13. A computer readable medium having a computer program embedded thereon when executed by a processor, for simultaneously receiving first radio frequency signals according to a first standard and second radio frequency signals according to a second standard different from the first standard, the first frequency signals including first information and the second radio frequency signals including second information, the program comprising the functions of:

converting the first and second radio frequency signals into first intermediate frequency signals;

converting the first intermediate frequency signals into second intermediate frequency signals; and retrieving the first information from the first intermediate frequency signals and the second information from the second intermediate signals.

* * * * *